(12) United States Patent
Nieleck et al.

(10) Patent No.: US 7,530,837 B2
(45) Date of Patent: May 12, 2009

(54) ELECTRICAL JUNCTION BOX FOR A SOLAR CELL MODULE

(75) Inventors: Udo Nieleck, Werdohl (DE); Dirk Quardt, Iserlohn (DE); Friedel Wasserfuhr, Wipperfuerth (DE); Zbigniew Zborowski, Luedenscheid (DE); Wieland Schmidt, Halver (DE); Holger Spelsberg, Luedenscheid (DE)

(73) Assignee: Guenther Spelsberg GmbH & Co. KG, Schalksmuehle (DE)

( * ) Notice: Subject to any disclaimer, the term of this patent is extended or adjusted under 35 U.S.C. 154(b) by 297 days.

(21) Appl. No.: 11/421,955

(22) Filed: Jun. 2, 2006

(65) Prior Publication Data

US 2006/0289053 A1 Dec. 28, 2006

(30) Foreign Application Priority Data

Jun. 3, 2005 (DE) .................. 10 2005 025 976

(51) Int. Cl.
*H01R 4/24* (2006.01)
(52) U.S. Cl. ...................... 439/441; 439/787
(58) Field of Classification Search ......... 439/436–441, 439/786, 787, 834, 835
See application file for complete search history.

(56) References Cited

U.S. PATENT DOCUMENTS

| 3,918,788 | A | 11/1975 | Walter et al. |
|---|---|---|---|
| 3,985,414 | A | 10/1976 | Walter et al. |
| 4,813,881 | A * | 3/1989 | Kirby ........................ 439/74 |
| 5,816,867 | A * | 10/1998 | Davidsz et al. ............. 439/828 |
| 6,488,527 | B2 * | 12/2002 | Yoon ........................ 439/441 |
| 6,582,249 | B1 | 6/2003 | Boeck et al. |
| 6,911,602 | B2 * | 6/2005 | Conrad ..................... 174/68.2 |
| 2005/0054219 | A1 | 3/2005 | Werner et al. |
| 2005/0054244 | A1 | 3/2005 | Werner et al. |

FOREIGN PATENT DOCUMENTS

| DE | 19639785 A1 | 4/1998 |
|---|---|---|
| DE | 102004020958 B3 | 8/2005 |

* cited by examiner

*Primary Examiner*—Tho D Ta
*Assistant Examiner*—Travis Chambers
(74) *Attorney, Agent, or Firm*—David S. Safran; Roberts Mlotkowski Safran & Cole, P.C.

(57) ABSTRACT

An electrical junction box for a solar cell module of solar cells which are connected with thin conductor strips, with a housing and electrical and/or electronic devices provided in the housing, and at least one electrical connection device (1) which has at least one terminal (3) and which is provided in the housing. The clamping mechanism (3) for producing clamping contact is made and arranged such that at least one thin conductor strip (5) routed out of the solar cell module can be inserted into the clamping mechanism in two different opposing entry directions. Thus, simple and reliable connection of thin conductor strips (5) routed out of the solar cell module can be guaranteed.

13 Claims, 6 Drawing Sheets

ELECTRICAL JUNCTION BOX FOR A SOLAR CELL MODULE

BACKGROUND OF THE INVENTION

1. Field of the Invention

The invention relates to an electrical junction box for a solar cell module of solar cells which are connected with thin conductor strips, with a housing and electrical and/or electronic means provided in the housing, and at least one electrical connection device which has at least one terminal means and which is provided in the housing.

2. Description of Related Art

Since the output voltage of individual solar cells is generally too low to operate electrical devices, such as household appliances or similar devices, generally, several solar cells are interconnected to form solar cell modules. In this regard, on the one hand, there is the possibility of series connection of the solar cells, and on the other, the possibility of parallel connection of the solar cells in the solar cell module. The individual currents of the solar cells are added to one another to form the overall current by parallel connection of the solar cells. In this connection, the solar cells connected in parallel should have essentially the same physical properties so that, in practice, the parallel connection of solar cells has hardly become common, especially also since an individual solar cell can already deliver a current of a few amperes.

In the assembly of solar cell modules with individual solar cells, the solar cells are therefore often series-connected. However, a problem can arise when a solar cell module is partially shadowed, therefore a solar cell or individual solar cells of the solar cell module receive less or no solar radiation at all. The reason for reduced solar radiation can be, for example, fouling of the solar cells or shadows cast by trees, building parts or buildings.

In contrast to shadowing of the solar module uniformly over its entire surface, which leads only to a reduction in output, the following problem arises with partial shadowing: A common current flows through the series-connected solar cells of the solar cell module, each individual solar cell with its respective voltage contributing to the total voltage of the solar cell module. If, at this point, one solar cell is shadowed, it no longer produces voltage and essentially a diode in the reverse direction opposes the current flow in the solar cell module. However, this means that the entire module can no longer deliver current, so that the overall operation of the solar cell module is adversely affected.

Moreover, it applies that there is a voltage on the shadowed solar cell which is dependent on the position of the shadowed solar cell in the series connection. If the voltage on the shadowed solar cell is greater than its blocking voltage, a breakdown occurs in the solar cell, and thus, the solar cell is permanently damaged. Even if the solar cell should not be damaged by the breakdown, a large power loss is converted in the shadowed solar cell so that the shadowed solar cell heats up. This heating can also lead to damage to the shadowed solar cell and to the solar cells adjacent to it.

In order to avoid the problems associated with the partially shadowed solar cells, diodes, so-called bypass diodes, which are connected anti-parallel to the solar cells are often used. This results in that a shadowed solar cell no longer supplies a portion to the overall voltage of the solar cell module, but the current flow is nevertheless maintained. The solar cell module thus shows only a reduced operating voltage, but does not fail completely. Moreover, in the shadowed solar cell, power is no longer converted, so that damage to the shadowed solar cell can be avoided.

Basically, each solar cell of a solar cell module could be assigned exactly one diode. However, often it happens that a plurality of series-connected solar cells is safeguarded by a respective common diode. Electrical junction boxes which are used for solar cell modules thus, generally, always have a plurality of bypass diodes. Moreover, in the electrical junction boxes, there can be other electrical and/or electronic means so that the conductors fed to the electrical junction box must be connected to electrical and/or electronic means, such as bypass diodes.

The solar cells in a solar cell module are generally connected to one another with thin conductor strips, so-called strings. These conductor strips typically have a thickness of a few tenths of a millimeter (roughly 0.3 mm) and a width of a few millimeters (roughly 3-8 mm). These conductor strips which connect the individual solar cells of the solar cell module to one another are routed out of the solar cell module so that thin conductor strips can be used directly for connection purposes.

The bypass diodes are generally located on a circuit board which is connected to the connection device of the junction box. The connection device is connected to the solar cell module via at least one conductor strip.

For connection, the conductor strips are typically routed from underneath into the electrical junction box which has a removable cover, so that the individual conductor strips can be brought by hand into contact with the electrical connection device provided in the housing of the junction box. To do this, the thin conductor strips coming from underneath from the solar cell module relative to the housing of the junction box are generally bent by 180° in order to then be connected coming from overhead, for example, via a clamping means to the terminal device. This bending is easily possible since the thin conductor strips which typically are made of metal are very flexible as a result of their dimensions, especially specifically their low thickness. In any case, this procedure is very complex and time-consuming, and connection faults cannot be easily avoided. Moreover, in the known junction box, it is disadvantageous that, based on the limited external dimensions of the housing generally within the junction box, the electrical and/or electronic means and the connection device must be located very near one another. For this reason, only a very small free space is available for connecting the conductor strips; this makes connection difficult.

SUMMARY OF THE INVENTION

Therefore, a primary object of the present invention is to devise a junction box for a solar cell module with which simple and reliable connection of thin conductor strips routed out of a solar cell module is enabled.

Proceeding from the initially described electrical junction box, the aforementioned object is achieved in a first alternative embodiment of the invention in that the clamping means for producing clamping contact between the connection device and the conductor strip is made and arranged such that at least one thin conductor strip routed out of the solar cell module can be inserted into the clamping means in two different opposing entry directions. Therefore, the invention takes a completely new approach in that thin conductor strips which are used for connection of the solar cells and which are routed out of the solar cell module of the invention can be inserted in two different preferably opposing entry directions into the clamping means, and thus, can be connected to the electrical connection device. The invention makes it possible, on the one hand, to insert the thin conductor strips being used to connect the solar cells from underneath, and on the other hand, to insert them into the clamping means from overhead. The invention thus avoids the complex procedure, known from the prior art, of routing the thin conductor strips for connecting the solar cell in the junction box first up, and then bending them by up to 180° in order to feed them to the connection device.

When the solar cells of the solar cell module are connected, the required effort is also greatly reduced by the invention. Therefore it is provided in accordance with the invention that, if necessary, a conductor strip can be inserted into the clamping means from one side of it or the other. Depending on the given arrangement of the connection device in the housing, it can be provided that the conductor strip be inserted into the clamping means in one entry direction or in the other. This yields far greater flexibility in the arrangement of the connection device in a junction box as claimed in the invention for a solar cell module. The junction box of the invention, moreover, further facilitates the connection of the thin conductor strips routed out of the solar cell module since the junction box can be placed on the solar cell module from two connection sides in order to insert the conductor strips from underneath into the electrical connection device.

The aforementioned object is achieved in an alternative embodiment of the initially described electrical junction box in that the clamping means is made and arranged such that both a clamping contact with at least one conductor strip and also one clamping contact with at least one preferably round supply lead of an electronic component especially the supply lead of a bypass diode, can be produced by inserting the conductor strip or the supply lead into the clamping means. Here, the invention is based on the idea of making the clamping means both for the connection of the conductor strip and also for the connection of an electronic component, such as, for example, a bypass diode.

For example, in the junction box, there can be a plurality of electrical connection devices which can be located preferably next to one another. In this case, it is possible to insert the first supply lead of an electronic component, preferably a bypass diode, into the clamping means of the first connection device and the second supply lead of the component into the clamping means of an adjacent, second connection device so that it is no longer necessary to arrange, for example, the bypass diodes on a circuit board, as is conventionally provided in the junction box known from the prior art. This leads to the free space available within the box for connecting the conductor strips being increased; this facilitates connection. Moreover, it is advantageous that the clamping means provided in the junction box in accordance with the invention can be connected, if necessary, to a conductor strip and/or to a supply lead of an electronic component; this leads to a simple structure of the junction box of the invention and to high flexibility in the arrangement of the connection device in the junction box as claimed in the invention.

In one especially preferred embodiment, it is provided that the clamping means is made Ω-shaped with two clamping legs which are connected via a bottom section which is located in the bottom area of the clamping means, which run onto one another in the direction to one clamping section of the clamping means, and which on the end pass into diverging entry bevels, so that the clamping means in the clamping section has an essentially X-shaped cross section. The Ω-shaped execution of the clamping means contributes to it being easily possible to insert a conductor strip and/or supply lead of an electronic component from overhead via entry bevels into the clamping section. Moreover, Ω-shaped clamping means can be easily produced and enable reliable electrical contact-making of the conductors which have been inserted into the clamping section.

In order to be able to insert a conductor strip, both from overhead via the entry bevels and also from underneath into the clamping section of the clamping means, according to the invention, it can be provided that there is at least one bottom-side entry section for a conductor strip and that the clamping legs are unconnected in the area of the entry section. Preferably, the bottom section has a recess which can be made for entry of a conductor strip. For example, it is possible for the bottom-side entry section, in the lengthwise direction of the clamping section, to extend in the direction to the middle area of the clamping legs, proceeding from the lengthwise sides of the clamping legs. However, basically, of course, it is also possible for the bottom-side entry section to be made as a slotted recess of the bottom section. If necessary, it can also be provided that the bottom section has several entry sections which lie next to one another in the lengthwise direction and which enable entry of the conductor strip into the clamping means through the bottom section.

In order to enable reliable electrical contact between a preferably round supply lead of an electronic component and the clamping means, it can be provided that the clamping leg of a clamping means in the clamping section has at least one outwardly arched, preferably shell-shaped entry section for the supply lead and that, furthermore preferably, the other entry section of one clamping leg and the other entry section of the other clamping leg are arranged oppositely. In the latter case, the two opposing entry sections are added to one another to form an essentially nut-shaped opening of the clamping section. If a round supply lead is inserted into this entry section, reliable electrical contact-making is ensured by the greater contact surface between the supply lead and the clamping leg.

The connection device can have a current bar onto which preferably two clamping means can be clamped such that, via the current bar, a line contact can be produced between at least one conductor strip inserted into the first clamping means and at least one supply lead inserted into the second clamping means, preferably the supply lead of a bypass diode. After clamping the clamping means onto the current bar, the current bar runs between the clamping section and is clamped between two clamping legs. In order to connect one conductor strip and/or one supply lead of an electronic component via the clamping means to the current bar, the conductor strip and/or the supply lead must be inserted into the clamping area formed between the current bar and one of the clamping legs. The conductor strip and the supply lead are thus clamped between the current bar and the clamping leg of the clamping means.

The current bar can be made segment-shaped with segment end sections which are arranged preferably essentially at right angles to one another. Preferably, on each of the two segment end sections, there is a respective clamping means. Furthermore, preferably, in the connection state, a conductor strip is connected to the clamping means and the supply lead is connected to the other clamping means. In one especially preferred embodiment, it is provided that the current bar is made essentially U-shaped and has one straight and one angled conductor leg. On the free end of the conductor leg, preferably of the angled conductor leg, there can be a terminal for connection of the connection device to a line contact which is routed out of the junction box Preferably, the terminal can be a tension spring terminal. However, basically, also other forms of terminals can also be used. Even if the above described execution of the current bar ensures especially simple installation of the connection device in the housing of the junction box and makes a comparatively large free space available for connection of the conductor strips, it is of course fundamentally also provided that the current bar be adapted, if necessary, to the actual space conditions, depending on the mechanical configuration of the electrical and/or electronic means provided in the housing.

The clamping legs and/or the bottom section can be produced from a spring material. This facilitates production and leads to low production costs. Basically, however, it is also possible for the terminal legs to the spring-mounted in order to make available sufficient clamping force in the area of the clamping section.

In particular, there is a plurality of possibilities for embodying and developing the electrical junction box in accordance with the invention, reference being made to the detailed description of a preferred embodiment of the invention below in conjunction with the accompanying drawings.

DETAILED DESCRIPTION OF THE INVENTION

Figure 1:
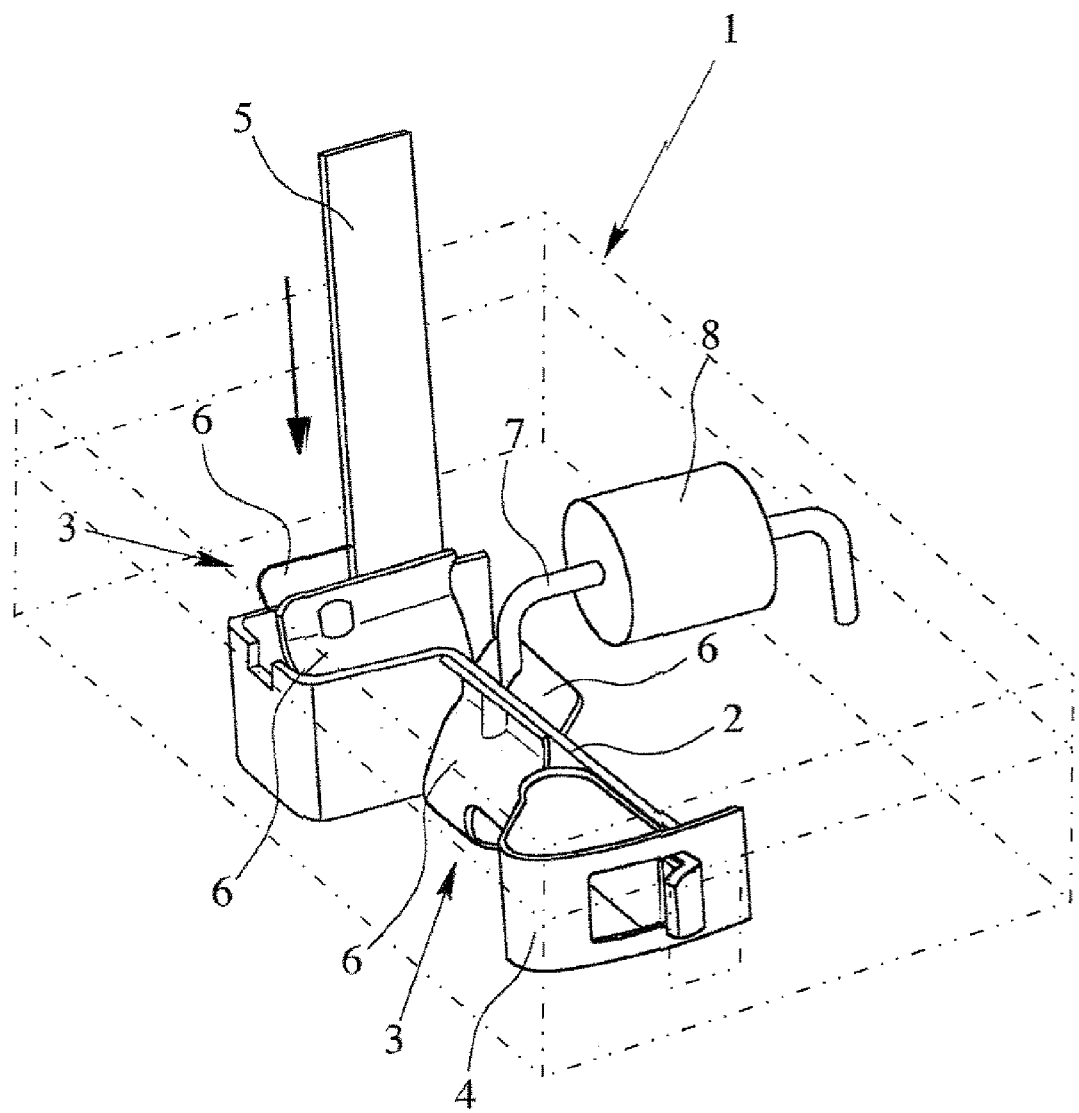
FIG. 1 is a perspective view of a connection device with two clamping means for use in a junction box in accordance with the invention for a solar cell module, a conductor strip being inserted from overhead into a clamping means of the connection device with the housing of the junction box being illustrated in phantom outline.

In FIG. 1, a preferred embodiment of a connection device 1 is shown which can be used to connect a junction box in accordance with the invention to a solar cell module the housing of the junction box being only schematically represented in phantom outline since the construction of the housing itself, apart from the provision of openings on additional sides. can be of any suitable construction and configuration known for junction boxes of this type. The connection device 1 has a current bar 2 and two clamping means 3 which are clamped onto the current bar 2. Fundamentally, more than two clamping means 3 can also be clamped onto the current bar 2. Moreover, the current bar 2 has a terminal 4 on a free end, and in this case, a tension spring terminal. In the installed state, the connection device 1 is located within the electrical junction box and is connected to the solar cell module via thin conductor strips 5.

Figure 2:
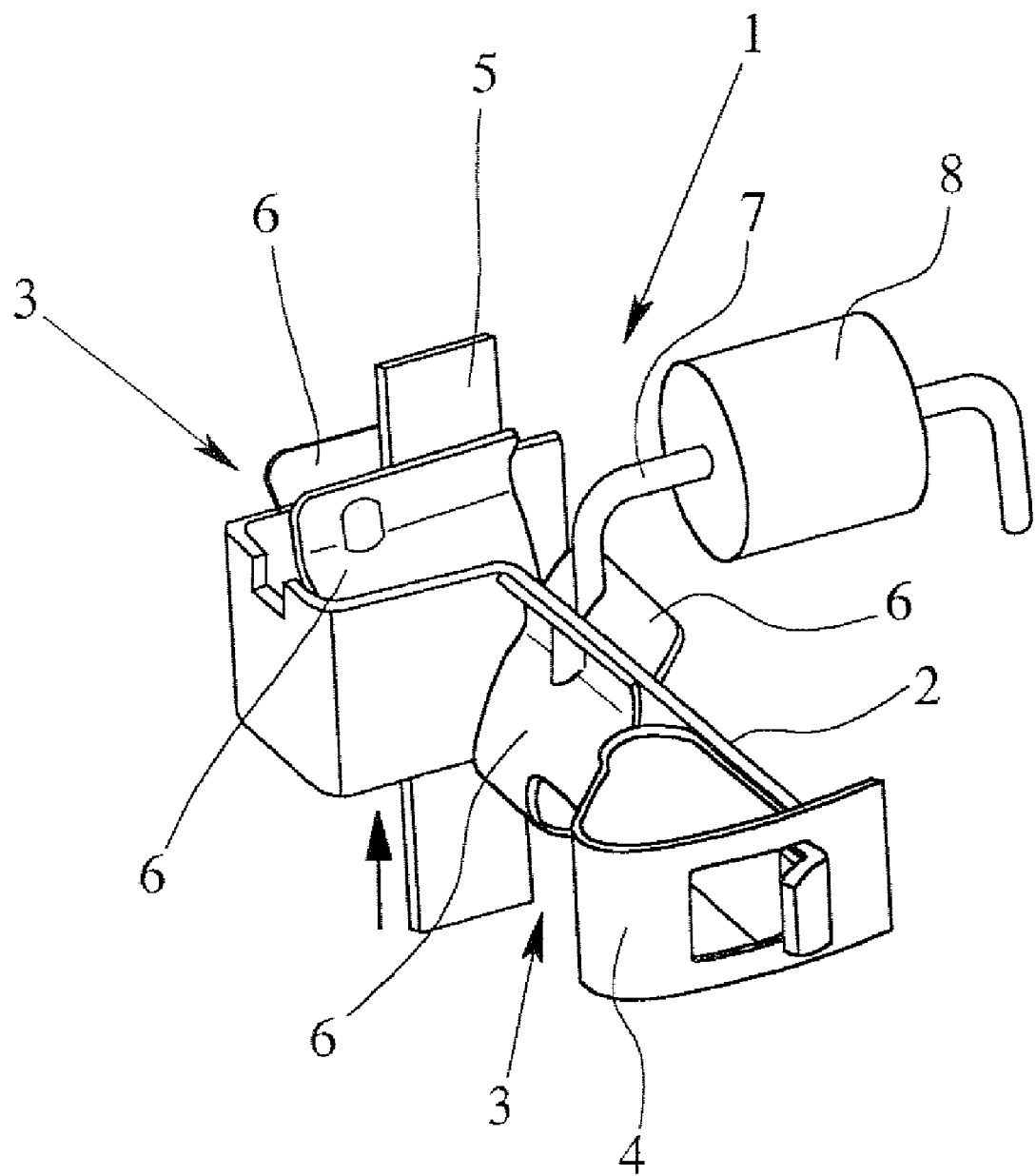
FIG. 2 shows the connection device which is shown in FIG. 1, the conductor strip being inserted from underneath into the clamping means.

In order to enable simple and reliable connection of the thin conductor strips 5 which have been routed out of the solar cell module, it is provided in accordance with the invention that the clamping means 3 is made and arranged for producing a clamping contact such that at least one thin conductor strip 5 routed out of the solar cell module can be inserted into the clamping means 3 in at least two different opposing entry directions. This becomes clear in a comparison of FIGS. 1 & 2, as shown in FIG. 1, the conductor strip 5 being inserted from overhead into the clamping means 3 and as shown in FIG. 2 from underneath into the clamping means 3. After entry of the conductor strip 5 into the clamping means 3, the conductor strip 5 is clamped between the clamping leg 6 of the clamping means 3 and the current bar 2.

Moreover, FIGS. 1 & 2 show that the clamping means 3 is made and arranged such that both a clamping contact with at least one conductor strip 5 and also one clamping contact with at least one preferably round supply lead 7 of an electronic component can be produced by inserting the conductor strip 5 or the supply lead 7 into the clamping means 3. According to the embodiments shown in FIGS. 1 & 2, a round supply lead 7 of a bypass diode 8 is inserted into another clamping means 3 which is clamped to the current bar 2. The other clamping means 3, in the embodiment shown in FIGS. 1 & 2, is clamped to a free end of an angled conductor leg of the current bar 2 which is made U-shaped here. To facilitate slipping the clamping means 3 onto the current bar 2, the current bar 2 is made segment-shaped. Even if it were also fundamentally possible for the connection device 1 to have only one clamping means 3 for connection to the conductor strip 5 and to the bypass diode 8, it is preferably provided that there is, a clamping means 3 for each conductor strip 5 and a clamping means 3 for each diode 8. This facilitates connection of the conductor strip 5 to the connection device 1.

Figure 3:
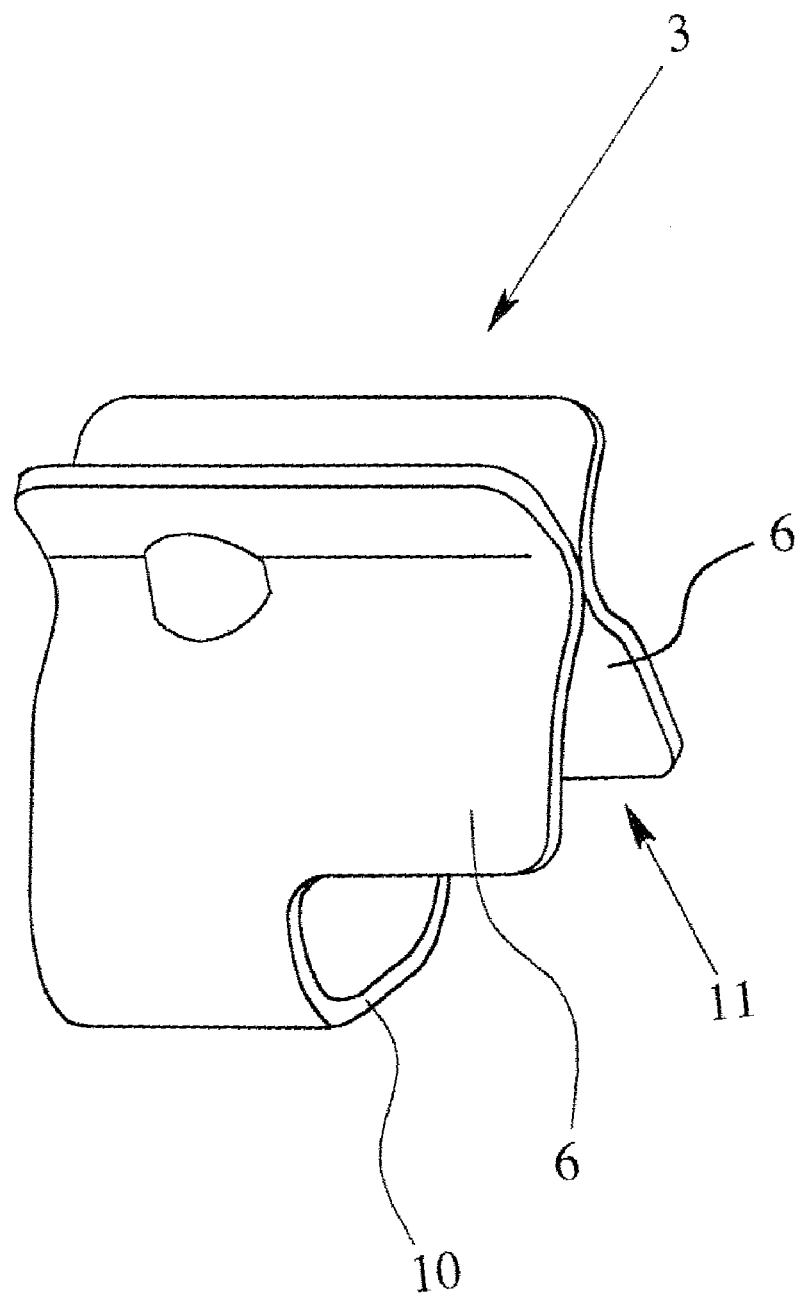
FIG. 3 shows a clamping means of the connection device shown in FIGS. 1 & 2 in a schematic view from the side.
Figure 4:
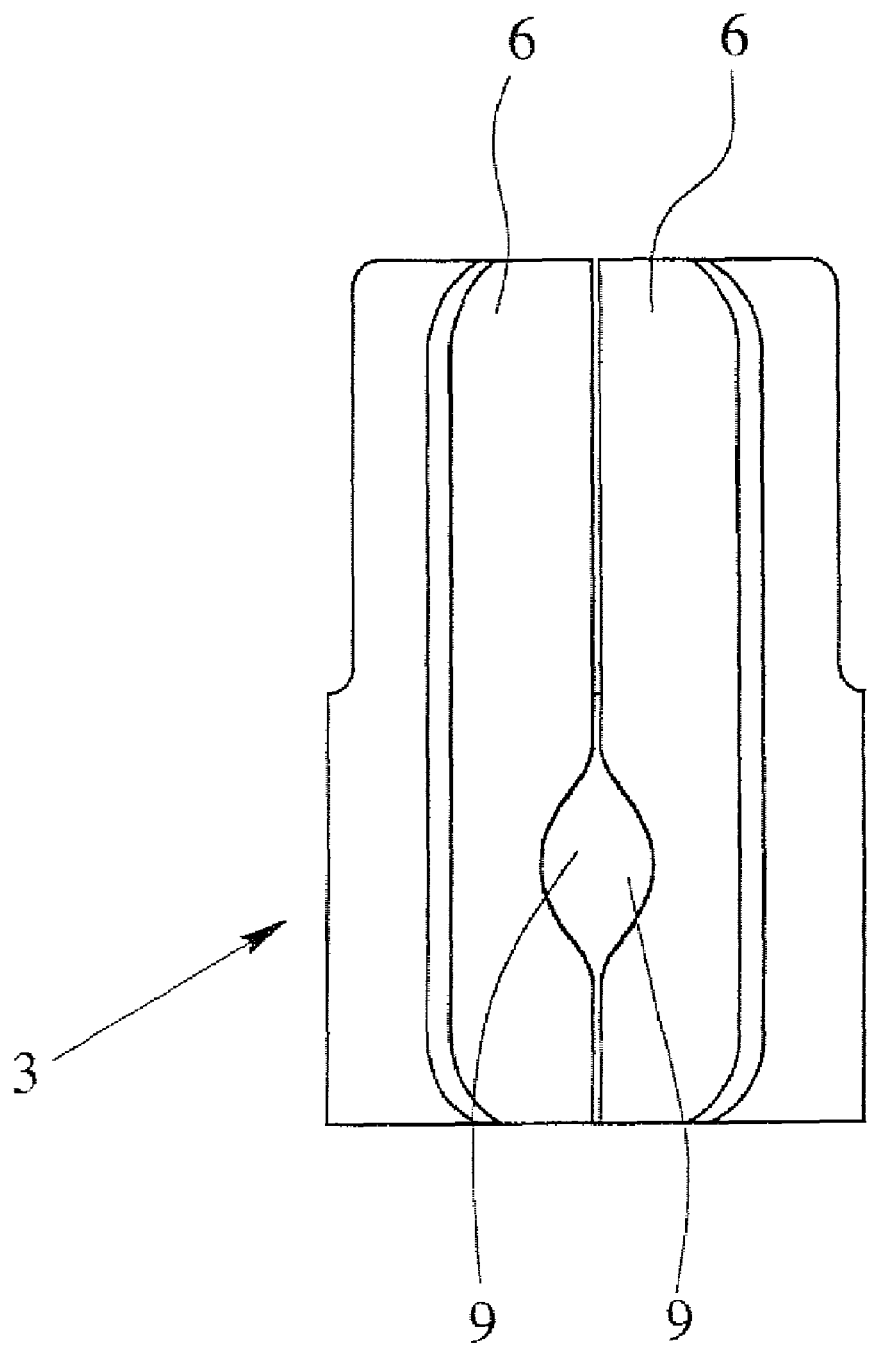
FIG. 4 shows the clamping means shown in FIG. 3 in a schematic view from overhead.

When the supply lead 7 of the bypass diode 8 is inserted into the clamping means 3, the supply lead 7 is routed or clamped between a clamping leg 6 of the clamping means 3 and the current bar 2. As FIGS. 3 & 4 show in particular, the clamping means 3 has two interacting clamping legs 6, each clamping leg 6 in a clamping section having at least one externally arched, preferably shell-shaped additional entry section 9 for the supply lead 7, and according to the illustrated embodiment, the other entry section of one clamping leg 6 and the other entry section 9 of the other clamping leg 6 can be arranged opposite. The shell-like bulging of the other entry section 9 ensures that reliable clamping contact between the supply lead 7 and the current bar 2 occurs after the supply lead 7 is inserted into the entry section 9.

FIG. 3 shows one of the clamping means 3 designed for connection to the conductor strip 5 and to the supply lead in FIGS. 1 & 2 in a schematic view from the side. The clamping means 3 is made generally Ω-shaped and has two clamping legs 6 which are connected via a bottom section 10 located in the bottom area of the clamping means 3, which run onto one another in the direction to one clamping section of the clamping means 3, and which on the end side pass into diverging entry bevels so that the clamping means 3 in the clamping section has an essentially X-shaped cross section. The entry bevels on the end of the clamping leg 6 facilitate the entry of the conductor strip 5 and/or of the supply lead 7. In the embodiment of the clamping means 3 shown in FIG. 3, the clamping legs 6 are connected to one another via the bottom section 10 only in areas. Proceeding from the lengthwise sides of the clamping legs 6 in the direction to the middle area of the clamping legs 6, a bottom-side entry section 11 extends via which it is possible to insert a conductor strip 5 even from underneath into the clamping means 3 in the direction to the clamping gap. Preferably, the clamping legs 6 and/or the bottom section 10 are made from a spring material in order to apply the clamping force necessary for clamping the clamping means 3 onto the current bar 2 and for clamping the conductor strip 5 and/or the supply lead 7.

Figure 5:
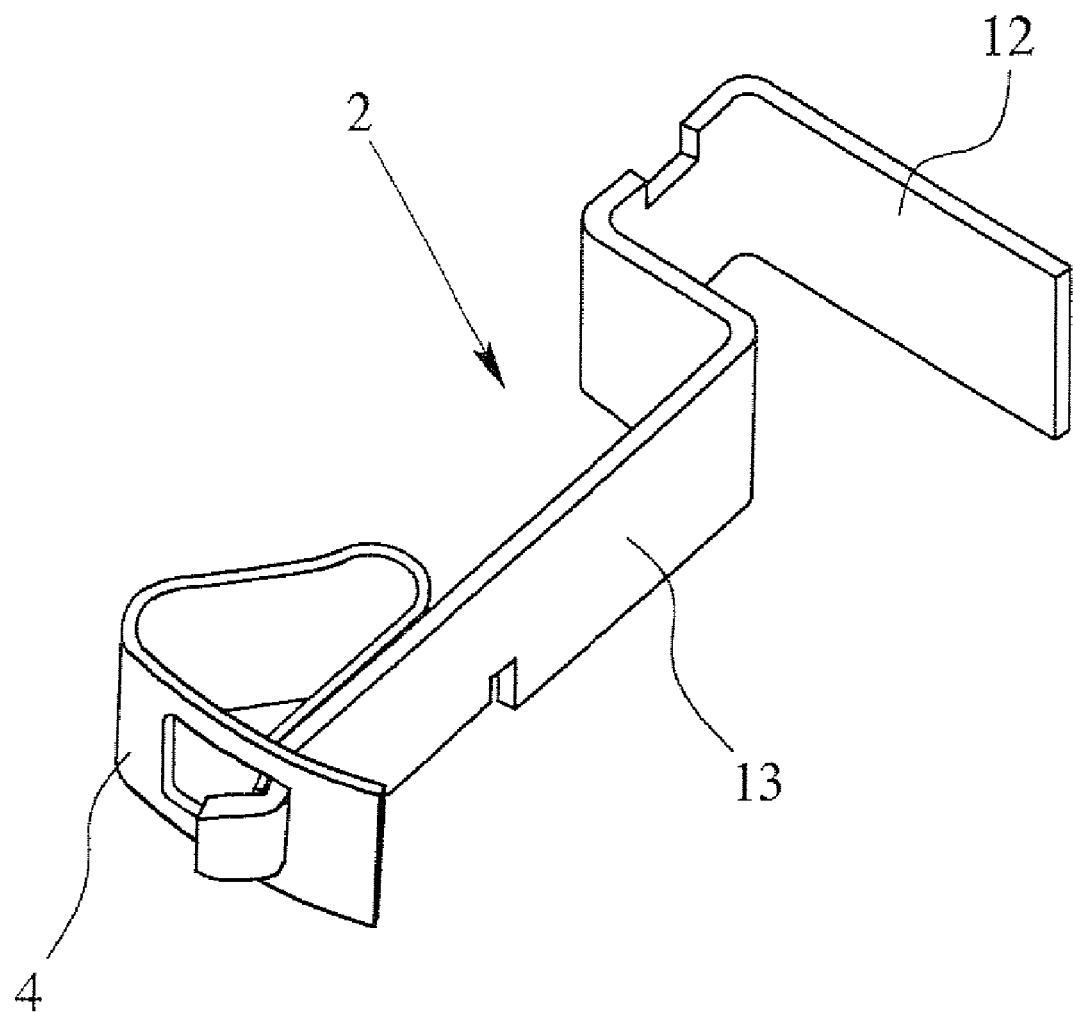
FIG. 5 is a perspective view of the current bar of the connection device shown in FIGS. 1 and 2, which bar has a terminal, in a schematic view from overhead
Figure 6:
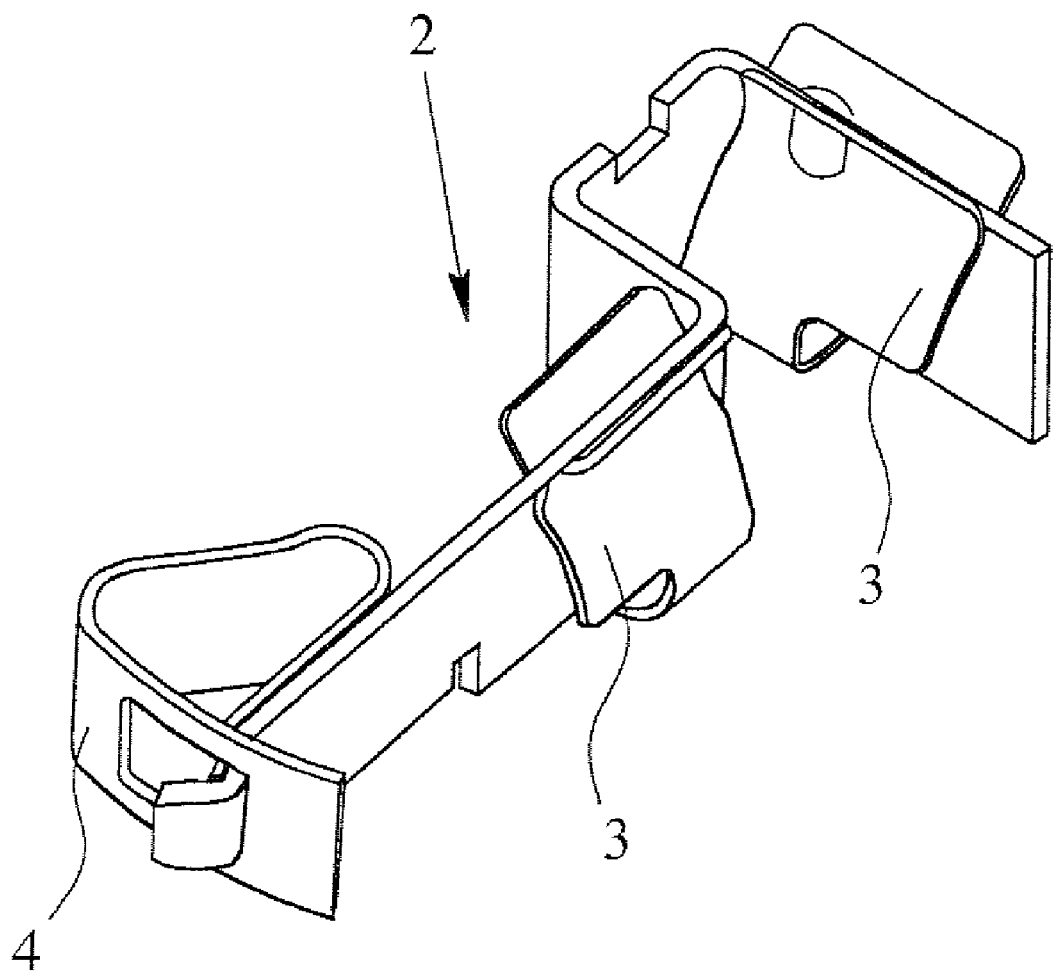
FIG. 6 is a perspective view of the current bar shown in FIG. 5 with two clamping means of the type shown in FIGS. 3 & 4, clamped onto the current bar.

FIG. 5 shows the current bar 2 of the connection device 1 shown in FIGS. 1 & 2. The current bar 2 is made essentially U-shaped and has a straight conductor leg 12 and an angled conductor leg 13. The current bar 2 is made segment-shaped, the terminal 4 being provided on a free end of the angled conductor leg 13. FIG. 6 again shows the current bar 2 shown in FIG. 5, two clamping means 3 being clamped onto the current bar 2.

As can be taken from the above description of the electrical junction box according to the preferred exemplary embodiment, the invention takes a completely new approach in that flexible, thin conductor strips 5 can be inserted both from the top and from the bottom into the housing of the electrical junction box and can be connected to the connection device 1 proceeding from two sides. Moreover, the execution of the connection device 1 provided in the junction box as claimed in the invention enables space-saving installation of the connection device 1 in the box. Otherwise the bypass diodes 8 can be easily connected to the current bar 2 via a clamping means 3, and to connect the conductor strips 5 and to connect the supply lead 7 clamping means 3 which have been made mechanically identical can be used. Both contribute to a simpler and more reliable connection of thin conductor strips 5 routed out of the solar cell module being enabled.

What is claimed is:

1. Electrical junction box for a solar cell module of solar cells which are connected with thin conductor strips, comprising:
    a housing,
    electrical and/or electronic means provided in the housing, and
    at least one electrical connection device which has at least one terminal means and which is provided in the housing,
    wherein the electrical connection device has clamping means for producing clamping contact, is made with a pair of clamping legs that are biased toward each other and are configured in a manner providing access for insertion of at least one thin conductor strip routed out of the solar cell module to between the clamping legs of the clamping means in entry directions at each of opposite sides of the clamping legs; wherein the connection device has a current bar, and wherein two clamping means are clamped onto the current bar such that, via the current bar, a line contact is producible between at least one conductor strip inserted into a first of the two clamping means and at least one supply lead inserted into a second of the two clamping means.

2. Electrical junction box as claimed in claim 1, wherein the clamping legs of the clamping means, in addition to having a surface shaped for making clamping contact with said at least one thin conductor strip, also are provided a notched or recessed portion shaped for making clamping contact with at least one round supply lead of an electronic component inserted into the clamping means.

3. Electrical junction box as claimed in claim 1, wherein the current bar is segment-shaped with segment end sections which are arranged essentially at right angles to one another, and wherein there is a respective clamping means on each the segment end sections.

4. Electrical junction box as claimed in claim 1, wherein at least one of the clamping legs and the bottom section is made of a spring material.

5. Electrical junction box as claimed in claim 1, wherein the clamping means is generally $\Omega$-shaped with the clamping legs connected via a bottom section which is located in a bottom area of the clamping means, the clamping legs and bottom section running onto one another in a direction toward a clamping section of the clamping means, and passing into diverging entry bevels on the end side, so that a clamping section of the clamping means has an essentially X-shaped cross section.

6. Electrical junction box as claimed in claim 5, wherein at least one of the clamping legs and the bottom section is made of a spring material.

7. Electrical junction box as claimed in claim 5, wherein the clamping means has at least one bottom-side entry section for a conductor strip and wherein the clamping legs are unconnected in the area of the entry section.

8. Electrical junction box as claimed in claim 7, wherein the bottom-side entry section extends in a direction to a middle area of the clamping legs in the lengthwise direction of the clamping section, proceeding from the lengthwise sides of the clamping legs.

9. Electrical junction box as claimed in claim 5, wherein the notched or recessed portion comprises at least one outwardly arched, entry section for a supply lead formed in the clamping legs, and wherein the entry section of one clamping leg and the other entry section of the other clamping leg are arranged opposite each other.

10. Electrical junction box as claimed in claim 9, wherein the entry sections are shell-shaped.

11. Electrical junction box as claimed in claim 1, wherein the current bar is essentially U-shaped and has a straight conductor leg and an angled conductor leg.

12. Electrical junction box as claimed in claim 11, wherein a terminal is provided on a free end of at least one of the conductor legs.

13. Electrical junction box as claimed in claim 11, wherein a terminal is provided on a free end of the angled conductor leg.

* * * * *